United States Patent
Boretz et al.

(10) Patent No.: US 7,362,496 B2
(45) Date of Patent: Apr. 22, 2008

(54) FIBER GAIN MEDIUM AND METHOD OF COUPLING PUMP ENERGY INTO THE SAME

(75) Inventors: Harry C. Boretz, Oak Park, CA (US); Vytas T. Gylys, Bell Canyon, CA (US); Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 687 days.

(21) Appl. No.: 10/827,792

(22) Filed: Apr. 20, 2004

(65) Prior Publication Data
US 2005/0231797 A1 Oct. 20, 2005

(51) Int. Cl.
*H01S 3/00* (2006.01)
*H01S 3/30* (2006.01)
(52) U.S. Cl. .................. 359/341.1; 359/341.3
(58) Field of Classification Search ............ 359/341.1; 372/6
See application file for complete search history.

(56) References Cited
U.S. PATENT DOCUMENTS

| 5,450,232 | A | 9/1995 | Sasaki et al. |
| 5,887,116 | A | 3/1999 | Grote |
| 6,256,139 | B1* | 7/2001 | Fujii et al. ............ 359/341.1 |
| 6,625,363 | B2* | 9/2003 | Carter et al. ............ 385/127 |
| 6,836,607 | B2* | 12/2004 | Dejneka et al. ........... 385/126 |
| 6,855,027 | B2* | 2/2005 | Duggal et al. ............ 445/24 |
| 2002/0009274 | A1 | 1/2002 | Gharavi |
| 2004/0018382 | A1 | 1/2004 | Kinlen |

FOREIGN PATENT DOCUMENTS

WO  WO 2004/064452 A1 *  7/2004

* cited by examiner

*Primary Examiner*—Mark Hellner
(74) *Attorney, Agent, or Firm*—Alston & Bird LLP

(57) ABSTRACT

A fiber gain medium assembly is provided. The fiber gain medium assembly includes a fiber gain medium, which in turn, includes a longitudinally extending inner core. The fiber gain medium also includes a cladding layer and a photo-emitting conductive polymer, both of which surround the inner core and extend longitudinally therealong. In this regard, the photo-emitting conductive polymer can surround the cladding layer to thereby surround the inner core. Alternatively, the cladding layer can comprise the photo-emitting conductive polymer. The fiber gain medium assembly can also include an electrical system electrically coupled to the photo-emitting conductive polymer. The electrical system is capable of providing an electric field to thereby excite the photo-emitting conductive polymer to emit photons capable of propagating into the inner core and producing gain for the signals propagating through the inner core.

17 Claims, 5 Drawing Sheets

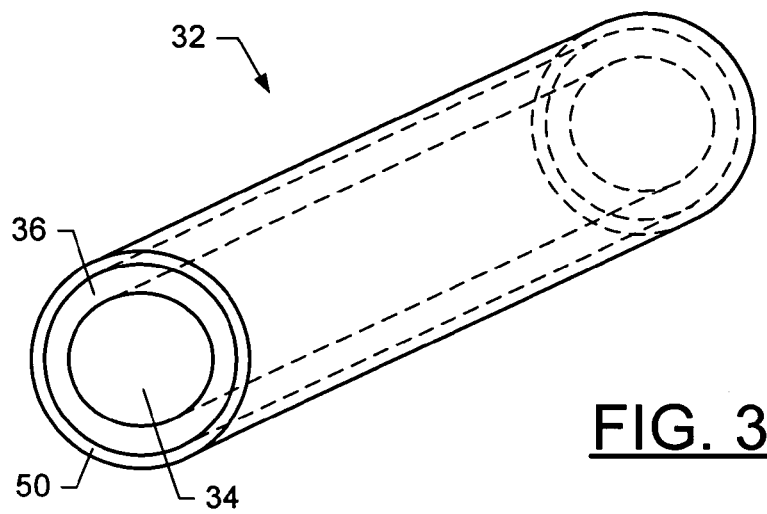
FIG. 3A.
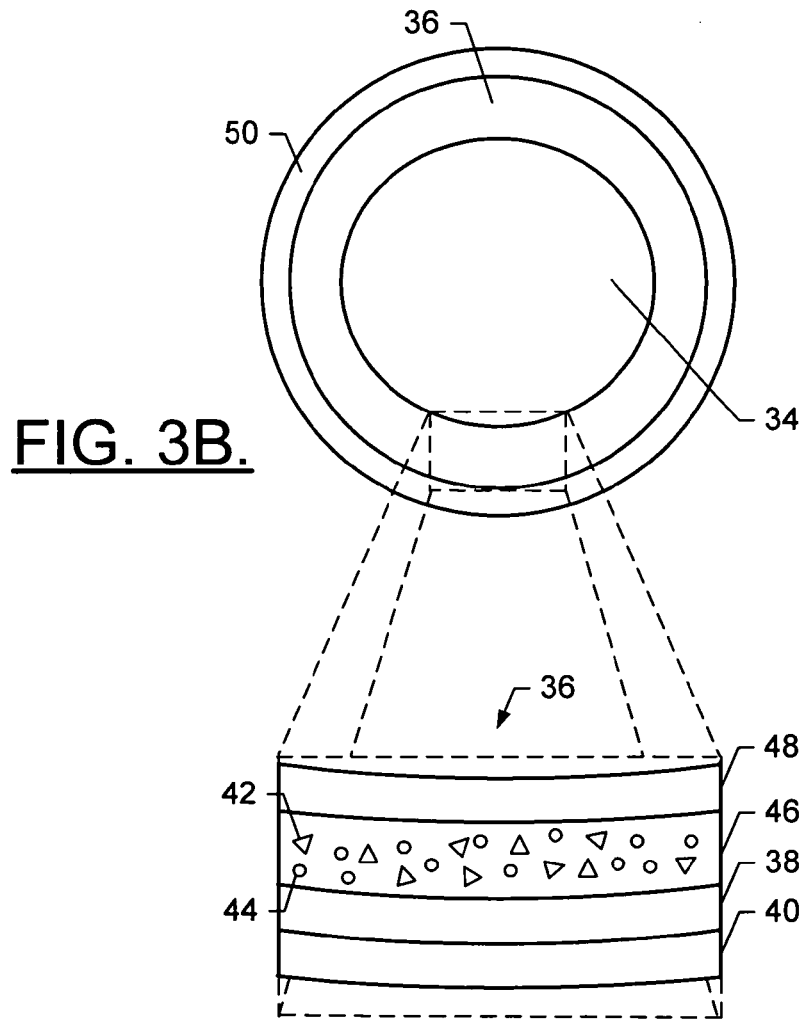
FIG. 3B.
FIG. 4.

FIBER GAIN MEDIUM AND METHOD OF COUPLING PUMP ENERGY INTO THE SAME

FIELD OF THE INVENTION

The present invention relates generally to optical fiber gain mediums and, more particularly, to techniques for coupling pump energy into an optical fiber gain medium.

BACKGROUND OF THE INVENTION

Fiber amplifiers are commonly used in many applications, including telecommunications applications and high power military and industrial fiber optic applications. For example, both U.S. Pat. No. 5,946,130, issued Aug. 31, 1999 to Rice and U.S. Pat. No. 5,694,408 issued Dec. 2, 1997 to Bott et al. describe many such applications in which fiber amplifiers are employed including the processing of materials, laser weapon and laser ranging systems, and a variety of medical and other applications.

Optical fiber amplifiers are designed to increase the power output levels of the signals propagating therealong. One conventional optical fiber amplifier design is an end pumped dual clad fiber. Referring to FIGS. 1A and 1B, the dual-clad fiber 10 has a single-mode signal core 12, a multi-mode pump core 14 surrounding the signal core, and an outer cladding layer 16 surrounding the pump core for confining pump energy within the pump core such that signals propagating through the signal core are amplified. The signal core will typically be doped with one or more rare earth elements such as, for example, ytterbium, neodymium, praseodymium, erbium, holmium or thulium. In operation pump energy is coupled into the pump core at the input end 18 of the fiber. The pump energy then propagates through the pump core until it is absorbed by the dopant in the signal core, thus amplifying signals propagating through the signal core. Although dual clad fibers can have different sizes, one typical dual clad fiber includes a signal core that has a diameter of 8-10 μm and a pump core that has cross-sectional dimensions of 100-300 μm. End pumped dual clad fiber amplifiers of this size can typically reach fiber energy power levels of 115 W.

To allow the largest amount of pump energy to be coupled into the end of the fiber, the size of the pump core is generally made as large as practical. The size of the pump core, however, is limited by the requirement to maintain a significant absorption of pump energy per unit length of fiber. While a design that introduces pump energy into the end of the fiber has led to great increases in output power levels, the practical limits have essentially been reached for pump arrays of typical power output. Facing this problem, a number of alternative pumping techniques have been developed. For example, U.S. Pat. No. 5,854,865 issued Dec. 29, 1998 to Goldberg discloses a fiber amplifier having a v-shaped notch cut into the pump core through the cladding layer. Pump energy can then be reflected or refracted from one of the angled faces of the v-shaped notch so as to be injected directly into the pump core. Another technique involves the use of a fiber amplifier having portions of the cladding and the pump core removed. The fiber amplifier is then spooled between two reflective elements and pump energy introduced into the region between the reflective elements. The pump energy is then repeatedly reflected by the reflective elements in order to amplify signals propagating through the signal core. Advantageously, such techniques also permit more uniform coupling of pump energy into the fiber, in contrast to techniques that only couple pump energy into the end of the fiber.

The current techniques, while achieving some level of success, also have their drawbacks. They can require extensive and tightly controlled processing. Also, they are generally not easily amenable to volume manufacturing and scaling. Thus, it would be advantageous to provide an inexpensive optical fiber amplifier with a relatively straightforward design that is capable of being fabricated in mass quantities while addressing each of the other aforementioned features.

SUMMARY OF THE INVENTION

In light of the foregoing background, the present invention provides an improved fiber gain medium, such as a fiber amplifier, and method of coupling pump energy into the same. In accordance with embodiments of the present invention, an improved fiber gain medium is provided that is capable of increasing the pump energy coupled into a fiber in an inexpensive manner with a relatively straightforward design. As explained below, the fiber gain medium includes a photo-emitting conductive polymer layer capable of emitting pump light when an electric current is applied to, or an electric field is applied across, the polymer layer. The pump light can then be absorbed by the inner core of the fiber gain medium to produce the (excited) upper laser state. By including a photo-emitting conductive polymer layer, the fiber gain medium of embodiments of the present invention can operate with increased pump energy coupled into the fiber in a manner more uniform along the length of the fiber, and less mechanically intrusive, than current techniques (e.g., v-shaped notch) for increasing the amount of pump energy coupled into the fiber.

According to one aspect of the present invention, a fiber gain medium assembly is provided. The fiber gain medium assembly includes a fiber gain medium, which in turn, includes a longitudinally extending inner core. The fiber gain medium also includes a cladding layer and a photo-emitting conductive polymer, both of which surround the inner core and extend longitudinally therealong. The photo-emitting conductive polymer can comprise, for example, an electroluminescent phosphor and a light-emitting material, and can be selected to have a refractive index smaller than a refractive index of the inner core. In one more particular embodiment, the photo-emitting conductive polymer can surround the cladding layer to thereby surround the inner core. Alternatively, the cladding layer can comprise the photo-emitting conductive polymer. In such instances, the cladding layer can further comprise a first electrode and a second electrode, with the photo-emitting conductive polymer being disposed therebetween.

The fiber gain medium assembly can further include an electrical system electrically coupled to the photo-emitting conductive polymer. More particularly, in instances in which the photo-emitting conductive polymer is disposed between first and second electrodes, the electrical system can be electrically coupled to the first and second electrodes to thereby electrically couple the electrical system to the photo-emitting conductive polymer.

In operation, a method of coupling pump energy into a fiber gain medium includes providing a fiber gain medium including an inner core and a photo-emitting conductive polymer. An electric field can then be applied across the photo-emitting conductive polymer to thereby excite the photo-emitting conductive polymer to emit photons capable of propagating into the inner core and producing gain for input signals propagating through the inner core. More particularly, in instances where the photo-emitting conductive polymer comprises an electroluminescent phosphor and a light-emitting material, the electric field can be applied to thereby excite the electroluminescent phosphor, and in turn, excite the light emitting material to thereby emit photons. Further, when the fiber gain medium or cladding layer includes first and second electrodes, the electric field can be applied by establishing a voltage differential between the first and second electrodes to thereby create the electric field across the photo-emitting conductive polymer.

Thus, the fiber gain medium and method of embodiments of the present invention solve the problems identified by prior techniques and provide additional advantages.

BRIEF DESCRIPTION OF THE DRAWINGS

Figure 1A:
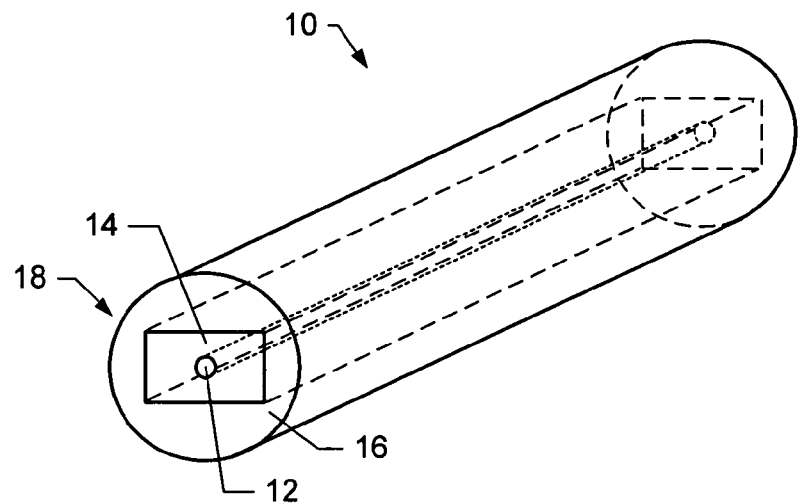
Figure 1B:
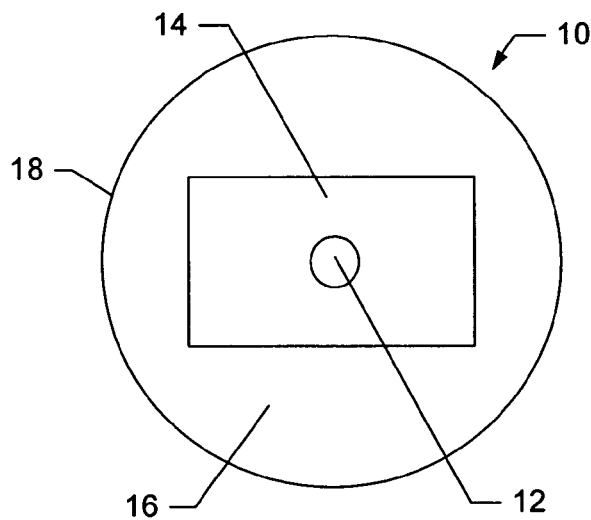
Figure 2:
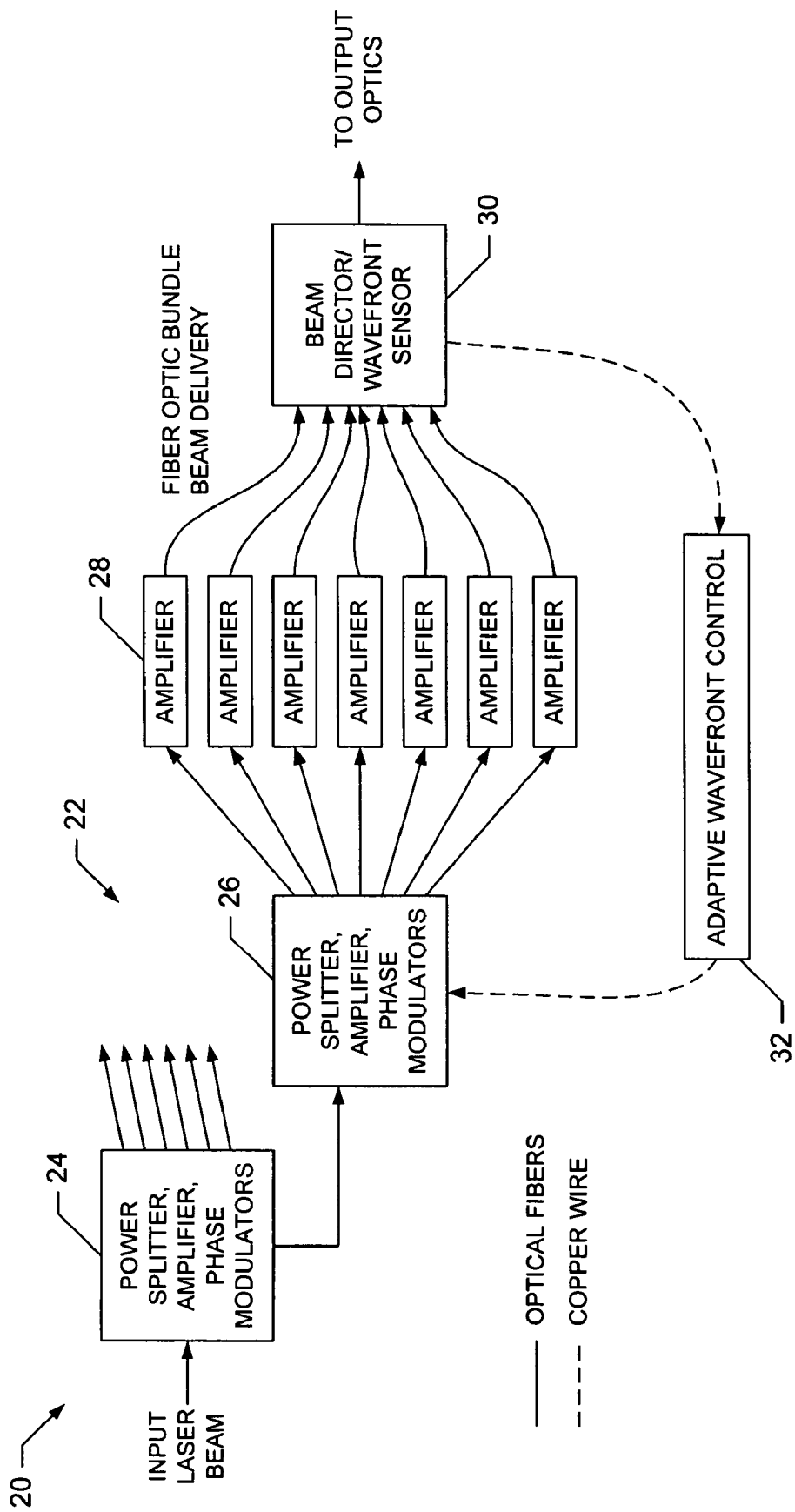
Figure 5A:
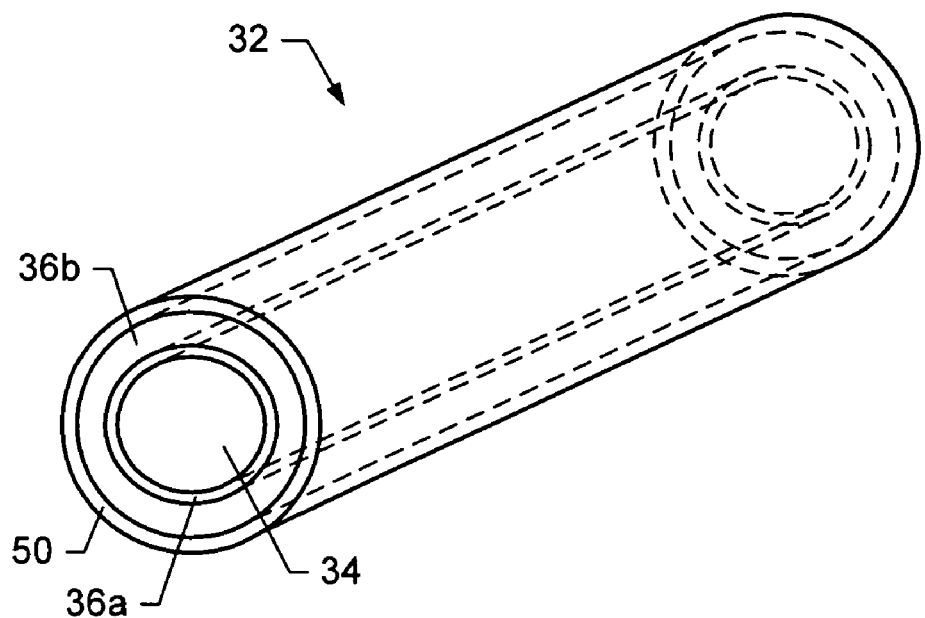
Figure 5B:
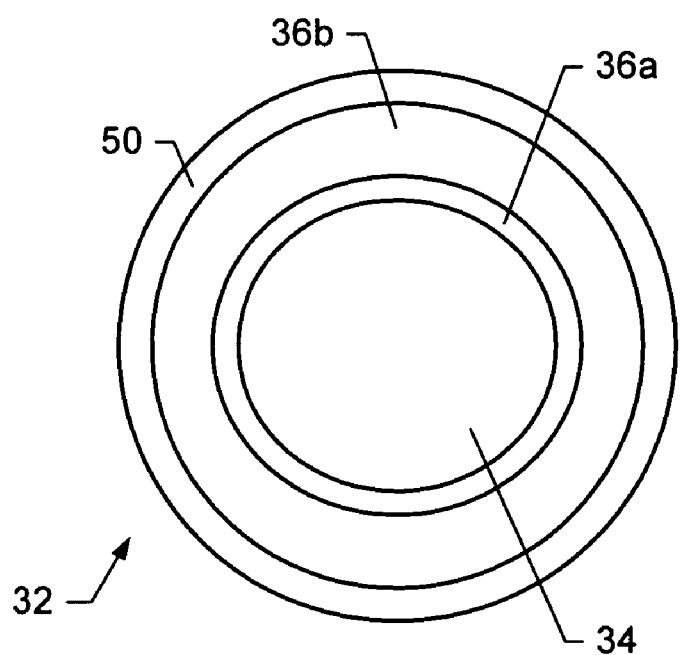
Figure 6:
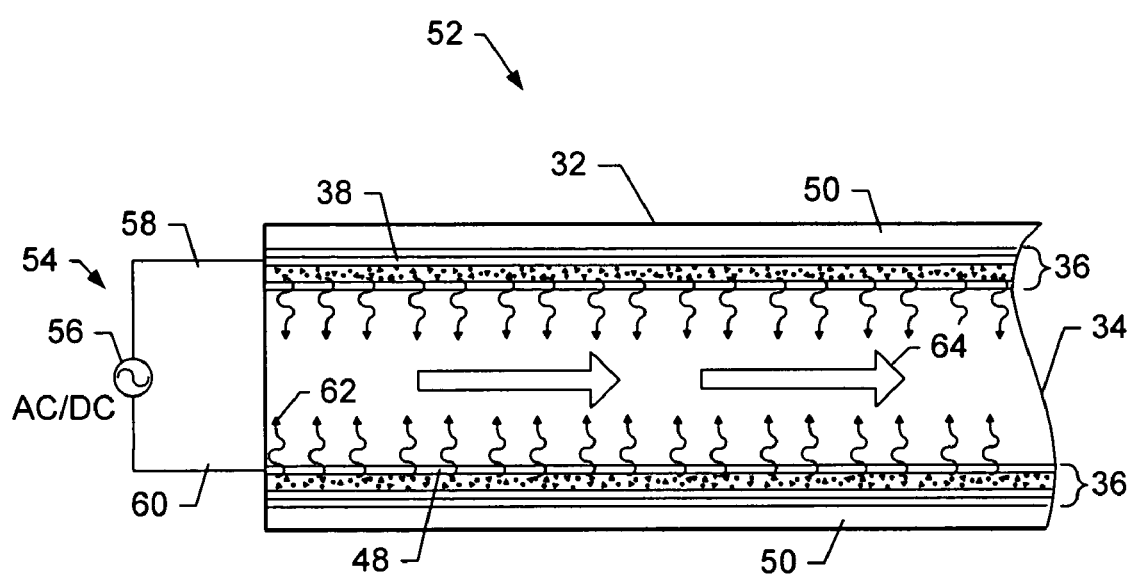

Having thus described the invention in general terms, reference will now be made to the accompanying drawings, which are not necessarily drawn to scale, and wherein:

FIGS. 1A and 1B illustrate an orthographic view and a front view, respectively, of a conventional end-pumped dual-clad fiber;

FIG. 2 is a block diagram of selected components of a laser amplifier fabricated using a plurality of fiber amplifiers according to one embodiment of the present invention;

FIGS. 3A and 3B illustrate an orthographic view and a front view, respectively, of a fiber amplifier according to one embodiment of the present invention;

FIG. 4 is a schematic block diagram of a portion of the cladding layer of the fiber amplifier of FIG. 3B, in accordance with one embodiment of the present invention;

FIGS. 5A and 5B illustrate an orthographic view and a front view, respectively, of a fiber amplifier according to another embodiment of the present invention; and FIG. 6 illustrates a fiber amplifier assembly, including a side view of an included fiber amplifier, in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those skilled in the art, fiber gain mediums such as fiber amplifiers can be utilized in a number of different applications. One example of a coherent phased array of fiber optic amplifiers suitable for use in the present invention for generating high-power laser beams needed for long-range radar system applications is shown in FIG. 2. This particular laser power amplifier is described in detail in U.S. Pat. No. 5,694,408, the contents of which are hereby incorporated by reference herein in its entirety. It will be appreciated that the power splitter, amplifier and phase modulator elements in FIG. 2 may be arranged in various configurations other than the exemplary arrangement illustrated in that Figure.

The fiber optic power amplifier 20 illustrated in FIG. 2 includes an input laser beam coupled to a fiber optic power amplifier 22. The laser beam can comprise, for example, a stable, very narrow linewidth, laser beam capable of operating in a $TEM_{00}$ mode at a frequency within the gain spectrum of the power amplifier, and capable of being coupled via an optical fiber to deliver a continuous wave or pulsed signal to downstream components. The fiber optic power amplifier also includes a first stage composed of a first beam splitter element 24, for splitting a received laser beam into a number N of secondary laser beams. Each of the secondary laser beams is provided to a second beam splitter element 26, which produces a number M of tertiary laser beams from a respective one of the secondary laser beams. Each of the tertiary laser beams is amplified by a respective fiber amplifier generally denoted 28. It will be appreciated that although two separate stages of beam splitter elements and one amplifier stage are depicted in FIG. 2, the fiber optic power amplifier can have more or less amplification stages. The power amplifier of FIG. 2 further includes a waveform sensor 30 in the output optical path, where the sensor signals are provided to phase modulators in elements 24, 26 via an adaptive waveform controller 32. Examples of the construction and operation of waveform sensor and waveform controller are provided in above-referenced U.S. Pat. No. 5,694,408.

As explained in the background section, to allow the largest amount of pump energy as possible to be coupled into a fiber, the size of the pump core is generally made as large as practical. The size of the pump core, however, is limited by the requirement to maintain a significant absorption of pump energy per unit length of fiber. To increase the amount of pump energy capable coupled into a fiber by providing pump energy not only at an end of the fiber amplifier, but at multiple locations along the length, designs such as the v-shaped notch design have been developed. And while such designs are adequate in increasing the amount of pump energy coupled into the fiber, such techniques have drawbacks, including requiring extensive and tightly controlled processing.

Therefore, in accordance with embodiments of the present invention, an improved fiber amplifier is provided that is capable of increasing the pump energy coupled into a fiber in an inexpensive manner with a relatively straightforward design. As explained below, the fiber amplifier includes a photo-emitting conductive polymer layer capable of emitting pump light when an electric current is applied to the polymer layer. The pump light can then be absorbed by the inner core of the fiber amplifier to produce the (excited) upper laser state. By including a photo-emitting conductive polymer layer, the fiber amplifier of embodiments of the present invention can operate with increased pump energy coupled into the fiber in a manner more uniform along the length of the fiber, and less mechanically intrusive, than current techniques (e.g., v-shaped notch) for increasing the amount of pump energy coupled into the fiber.

Reference is now made to the drawings, and in particular FIGS. 3A and 3B which depict a perspective and front view, respectively, of an optical fiber gain medium of one embodiment of the present invention. As shown and described above, the fiber gain medium comprises a fiber amplifier 32. It should be understood, however, that the fiber gain medium can include any type of fiber configured in accordance with embodiments of the present invention, as explained below. In this regard, should also be understood that, although a "fiber amplifier" is described herein as an exemplar fiber gain medium, the fiber gain medium can alternatively comprise any and all variations of the same, including a fiber laser, fiber laser amplifier, fiber laser oscillator and the like.

As shown, the fiber amplifier includes an inner core 34 doped with one or more rare earth elements such as, for example, ytterbium, neodymium, praseodymium, erbium, holmium or thulium. The inner core is designed to support the propagation and amplification of signals in a single mode and is therefore also known as a single-mode signal core, although the inner core could be designed to support the propagation and amplification of signals of multiple modes of signals. Although not shown, in various configurations the fiber amplifier 32 comprises a dual-clad fiber amplifier, and in such instances, the fiber amplifier also includes an outer core surrounding the inner core 34. The outer core generally supports the propagation of multiple modes of pump signals and is therefore also known as a multi-mode pump core. In addition, the outer core is preferably designed to have a lower index of refraction $N_p$ than the inner core in order to confine the signals within the inner core. For example, both the inner and outer cores can be formed silica with the inner core doped with germanium, in addition to a rare earth element, in order to have a greater refractive index $N_c$.

The fiber amplifier 32 also includes a cladding layer 36 that surrounds the inner core 34, or the outer core in dual clad configurations. While the cladding layer can be formed of various materials, in accordance with one advantageous embodiment of the present invention, the cladding layer is formed of a photo-emitting conductive polymer. In this regard, the photo-emitting conductive polymer can comprise an electroluminescent phosphor in operative contact with a light-emitting material such that excitation of the electroluminescent material by an alternating current electric field causes the emission of light by the light-emitting material. Further, to provide alternating current to the electroluminescent material, the cladding layer can further include a pair of electrodes, with the electroluminescent material and light-emitting material sandwiched therebetween.

More particularly, in one embodiment of the present invention, as shown in FIG. 4, the cladding layer 36 comprises a first electrode 38 applied to a substrate 40. As will be appreciated, the first electrode and substrate can be constructed from any appropriate material. For example, the first electrode can be formed from an electrically conductive material such as an intrinsically conductive polymer (ICP) including, for example, polyaniline, polyacetylene, poly-p-phenylene, poly-m-phenylene, polyphenylene sulfide, polypyrrole, polythiophene, polycarbazole and the like, which can be substituted or unsubstituted. Also, for example, the substrate can be formed from a flexible material, such as a plastic film or a woven or non-woven textile material, including, for example, poly(3,4-ethylenedioxythiophene) doped with polystyrenesulfonic acid (e.g., PEDOT/PSSA, available from Agfa-Gevaert, Mortsel, Belgium). As will be appreciated, however, the substrate can be formed of an electrically conductive material (e.g., ICP), and thus function as the first electrode.

In addition to the first electrode 38 and the substrate 40, the cladding layer can include an electroluminescent phosphor 42 and a light-emitting material 44, each of which can be in particulate form and dispersed within a binder 46. The electroluminescent phosphor, light-emitting material and binder can be constructed from any appropriate material. For example, the electroluminescent phosphor can be constructed from copper-doped zinc sulfide (ZnS:Cu). The light emitting material, which can be present either as small particles distributed through the binder or dissolved in the binder can be constructed, for example, from poly[2-methoxy-5-(2'-ethyl)hexoxy-1,4-phenlyenevinylene] (MEH-PPV). The binder, in turn, can comprise an electrically non-conducting material such as poly(vinylidenedifluoride) (PVDF), for example.

Irrespective of the construction of the electroluminescent phosphor 42 and the light-emitting material 44, the cladding layer 36 can further include a second electrode 48 applied over the binder 46. In this regard, like the first electrode 38, the second electrode can comprise an ICP. However, the second electrode is typically constructed of a material that is transparent to radiation emitted by the light-emitting material in order for that radiation to exit the cladding layer and penetrate into the 20 inner core 34 of the fiber amplifier 32. For more information on such a cladding layer, as well as alternative configurations of a photo-emitting conductive polymer capable of functioning as a cladding layer in accordance with embodiments of the present invention, see U.S. Patent Application Publication No. 2004/0018382 A1 entitled: Electroluminescent Device and Methods for its Production and Use, filed Jan. 28, 2003, the contents of which are hereby incorporated by reference in its entirety.

Although the cladding layer 36 can be constructed in a manner described above, it should be understood that the cladding layer is typically constructed such that the cladding layer that has a refractive index $N_{cl}$ that is lower than the refractive index of the inner core (and outer core in such configurations). As such, the cladding layer can be capable of confining pump energy within the fiber amplifier 32, or more particularly within the inner core 34, during operation. Also, although the cladding layer is shown and described herein as including a pair of electrode layers, the electrode layers can, but need not, be continuous along the length of the fiber amplifier. In this regard, the electrode layers can comprise a one or more pairs of first and second electrodes, with each pair distributed in a spaced-apart relationship with one another.

Irrespective of how the cladding layer 36 is constructed, the fiber amplifier 32 can, but need not, include a reflective layer 50 surrounding the cladding layer. The reflective layer can be formed from any of a number of different materials such as, for example, silicon, germanium, titanium or the like. In this regard, the reflective layer can function to reflect pump energy, otherwise propagating in a direction opposite the inner core 34, in a direction toward the inner core. In addition, the reflective layer can function to protect the cladding layer from damage.

As will be appreciated, in various instances it may be desirable to include a separate cladding layer and layer of photo-emitting conductive polymer. Thus, in an alternative embodiment shown in FIGS. 5A and 5B, the fiber amplifier 32 can be constructed to include separate cladding and photo-emitting conductive polymer layers 36a and 36b, respectively. In such an embodiment, the cladding layer can surround the inner core 34 (or the outer core in dual clad configurations), while the photo-emitting conductive polymer layer surrounds the cladding layer. The photo-emitting conductive polymer layer of this embodiment can be constructed in the same manner as the cladding layer 36 described above with respect to FIGS. 3A and 3B (see FIG. 4), while the cladding layer 36a can be constructed, for example, from a material, such as a polymer. Typically, however, the cladding layer 36a is constructed from a transparent material to permit photons to pass from the photo-emitting conductive polymer layer into the inner core of the fiber amplifier 32. The cladding layer also typically has a refractive index $N_{cl}$ lower than the refractive index of the inner core. Similarly, then, the photo-emitting conductive polymer layer is typically constructed such that the photo-emitting conductive polymer layer has a refractive index $N_{pp}$ lower than the refractive index of the cladding layer 36a.

Reference is now made to FIG. 6, which illustrates a portion of a fiber amplifier assembly 52 in accordance with one embodiment of the present invention. As shown, the fiber amplifier assembly includes a fiber amplifier 32 (a portion of which is shown in FIG. 6). As shown, the fiber amplifier comprises a fiber amplifier of the embodiment shown in FIGS. 3A and 3B, although it should be understood that the fiber amplifier could equally comprise the fiber amplifier of the embodiment shown in FIGS. 5A and 5B. The fiber amplifier includes an inner core 34 surrounded by a cladding layer 36 that includes a photo-emitting conductive polymer (e.g., an electroluminescent phosphor 42 and a light-emitting material 44 in particulate form and dispersed within a binder 46—see FIG. 5). The cladding layer also includes a first electrode 38 and a second electrode 48 on either side of the photo-emitting conductive polymer.

The fiber amplifier assembly 52 further includes an electrical system 54, such as an alternating current (AC) electrical system. The electrical system includes a power source 56 capable of supplying alternating or direct current of a desired voltage and amperage. For example, the power source can be capable of supplying 9 Volts and 100 milliamps of alternating current. The electrical system also includes a first lead 58 and a second lead 60 electrically coupled to the power source. The first and second leads, in turn, can be electrically coupled to the first and second electrodes 38, 48, respectively, of the cladding layer 36 of the fiber amplifier 32. As will be appreciated, the leads can be constructed of any of a number of different electrically conductive materials such as copper.

In operation, when the power source 56 of the electrical system 54 supplies power to the first and second leads 58, 60 by creating a voltage differential therebetween, a similar voltage differential is created between the first and second electrodes 38, 48 of the cladding layer 36 of the fiber amplifier, which, in turn, creates an electric field across the photo-emitting conductive polymer. The resulting electric field between the first and second electrodes, in turn, causes the photo-emitting conductive polymer to emit photons 62 that propagate into the inner core 34 of the fiber amplifier. More particularly, for example, the resulting electric field causes excitation of the electroluminescent phosphor 42, which causes excitation of the light-emitting material 44. The light-emitting material, then, emits photons that propagate into the inner core.

As the photo-emitting conductive polymer of the cladding layer 36 emits photons 62, the photons propagate into the inner core 34 of the fiber amplifier 32 where at least a portion of the photons can be absorbed by dopant in the inner core to produce gain for input signals 64 propagating through the inner core. More particularly, upon entering the inner core, the photons generally propagate both lengthwise along the inner core and laterally across the inner core while being absorbed by dopant. As will be appreciated, at least a portion of the photons can propagate laterally across the inner core until encountering the interface of the inner core and cladding layer without being absorbed by dopant in the inner core. And as will also be appreciated, at least a portion of the photons can reach the interface of the cladding and the inner core at an angle greater than a critical angle such that those photons escape through the cladding. In such instances, as well as instances in which the photo-emitting conductive polymer of the cladding emits photons in a direction opposite from the inner core, the reflective layer 50 surrounding the cladding layer can function to reflect the photons escaping through the cladding back through the cladding and into the inner core. Once back within the inner core, the photons can again propagate through the inner core and be absorbed by dopant in the inner core.

As will be appreciated, the fiber amplifier 32 of embodiments of the present invention can be fabricated in any of a number of different manners. For example, with respect to the embodiment of FIGS. 3A and 3B, the inner core 34 can be fabricated in accordance with an extrusion process. Thereafter, the cladding layer 36 formed of a photo-emitting conductive polymer can be fabricated on the inner core by depositing the polymer on the inner core, such as in accordance with a chemical vapor deposition technique. Alternatively, the inner core can be pulled through a slurry of polymer in a semi-soluble form. In another alternative, the inner core can be treated with a surfactant such as MHA (16-mercaptohexadecanoic acid), after which the polymer can be sprayed on the inner core. Irrespective of how the cladding layer is fabricated on the inner core, the reflective layer 50 can thereafter be formed on the cladding layer, such as in accordance with a chemical vapor deposition technique.

As shown and described above, the fiber amplifier 32 comprising a single-clad fiber amplifier. It should be understood, however, that the fiber amplifier assembly can include any type of fiber, including a dual-clad fiber amplifier. Thus, the fiber amplifier assembly of embodiments of the present invention can comprise any fiber including a photo-emitting conductive polymer surrounding the inner core to increase the amount of pump energy capable coupled into the fiber.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fiber gain medium assembly comprising:
   a fiber gain medium comprising:
   a longitudinally extending inner core;
   a cladding layer surrounding the inner core and extending longitudinally therealong; and
   a photo-emitting conductive polymer surrounding the inner core and extending longitudinally therealong, wherein the photo-emitting conductive polymer is selected to have a refractive index smaller than a refractive index of the inner core.

2. A fiber gain medium comprising:
   an inner core capable of supporting signals propagating therethrough; and
   a photo-emitting conductive polymer surrounding the inner core, the photo-emitting conductive polymer being capable of receiving an electric field to thereby excite the photo-emitting conductive polymer to emit photons capable of propagating into the inner core and producing gain for the signals propagating through the inner core, and wherein the photo-emitting conductive polymer is selected to have a refractive index smaller than a refractive index of the inner core.

3. A method of coupling pump energy into a fiber gain medium, the method comprising:

providing a fiber gain medium comprising:
a longitudinally extending inner core; and
a photo-emitting conductive polymer surrounding the inner core and extending longitudinally therealong, wherein providing a fiber gain medium comprises providing a fiber gain medium including a photo-emitting conductive polymer selected to have a refractive index smaller than a refractive index of the inner core; and
applying an electric field across the photo-emitting conductive polymer to thereby excite the photo-emitting conductive polymer to emit photons capable of propagating into the inner core and producing gain for input signals propagating through the inner core.

4. A fiber gain medium assembly according to claim 1, wherein the photo-emitting conductive polymer surrounds the cladding layer to thereby surround the inner core.

5. A fiber gain medium assembly according to claim 1, wherein the cladding layer comprises the photo-emitting conductive polymer.

6. A fiber gain medium assembly according to claim 5, wherein the cladding layer further comprises a first electrode and a second electrode, the photo-emitting conductive polymer being disposed therebetween.

7. A fiber gain medium assembly according to claim 1, wherein the photo-emitting conductive polymer comprises an electroluminescent phosphor and a light-emitting material.

8. A fiber gain medium assembly according to claim 1 further comprising:
an electrical system electrically coupled to the photo-emitting conductive polymer.

9. A fiber gain medium assembly according to claim 8, wherein the photo-emitting conductive polymer is disposed between a first electrode and a second electrode, and wherein the electrical system is electrically coupled to the first and second electrodes to thereby electrically couple the electrical system to the photo-emitting conductive polymer.

10. A fiber gain medium according to claim 2 further comprising:
a cladding layer surrounding the inner core, wherein the photo-emitting conductive polymer surrounds the cladding layer to thereby surround the inner core.

11. A fiber gain medium according to claim 2 further comprising:
a cladding layer surrounding the inner core, wherein the cladding layer comprises the photo-emitting conductive polymer.

12. A fiber gain medium according to claim 11, wherein the cladding layer further comprises a first electrode and a second electrode, the photo-emitting conductive polymer being disposed therebetween.

13. A fiber gain medium according to claim 2 wherein the photo-emitting conductive polymer comprises an electroluminescent phosphor and a light-emitting material.

14. A method according to claim 3, wherein providing a fiber gain medium comprises providing a fiber gain medium including photo-emitting conductive polymer comprising an electroluminescent phosphor and a light-emitting material.

15. A method according to claim 14, wherein applying an electric field comprises applying an electric field to thereby excite the electroluminescent phosphor, and in turn, excite the light emitting material to thereby emit photons.

16. A method according to claim 3 wherein providing a fiber gain medium comprises providing a fiber gain medium including a cladding layer comprising the photo-emitting conductive polymer.

17. A method according to claim 16, wherein providing a fiber gain medium comprises providing a fiber gain medium further including a first electrode and a second electrode, the photo-emitting conductive polymer being disposed therebetween, and wherein applying an electric field comprises establishing a voltage differential between the first and second electrodes to thereby create the electric field across the photo-emitting conductive polymer.

* * * * *